United States Patent
Huber et al.

(10) Patent No.: US 9,957,625 B2
(45) Date of Patent: May 1, 2018

(54) ELECTRODE UNIT

(71) Applicant: BASF SE, Ludwigshafen (DE)

(72) Inventors: Günther Huber, Ludwigshafen (DE);
Jesus Enrique Zerpa Unda, Viernheim (DE); Michael Lutz, Speyer (DE);
Peter Heidebrecht, Speyer (DE);
Domnik Bayer, Heidelberg (DE);
Wolfgang Jabczynski, Venningen (DE);
Anna Katharina Dürr, Ludwigshafen (DE); Katrin Freitag, Ludwigshafen (DE)

(*) Notice: Subject to any disclaimer, the term of this patent is extended or adjusted under 35 U.S.C. 154(b) by 976 days.

(21) Appl. No.: 13/915,097

(22) Filed: Jun. 11, 2013

(65) Prior Publication Data

US 2014/0030577 A1  Jan. 30, 2014

Related U.S. Application Data

(60) Provisional application No. 61/657,915, filed on Jun. 11, 2012.

(51) Int. Cl.
*H01M 2/16* (2006.01)
*H01M 2/18* (2006.01)
(Continued)

(52) U.S. Cl.
CPC ............ *C25B 13/02* (2013.01); *C25B 13/04* (2013.01); *H01M 2/1673* (2013.01); *H01M 2/18* (2013.01);
(Continued)

(58) Field of Classification Search
CPC .... C25B 13/02; C25B 13/04; H01M 10/3945; H01M 10/3954; H01M 10/3909;
(Continued)

(56) References Cited

U.S. PATENT DOCUMENTS

| 3,533,848 A | 10/1970 | Winn |
| 3,791,868 A | 2/1974 | Compton et al. |

(Continued)

FOREIGN PATENT DOCUMENTS

| CA | 2802555 A1 | 12/2011 |
| DE | 1771148 A1 | 2/1972 |

(Continued)

OTHER PUBLICATIONS

International Search Report for PCT/EP2011/060275 dated Nov. 2, 2011.

*Primary Examiner* — Lisa S Park
(74) *Attorney, Agent, or Firm* — Drinker Biddle & Reath LLP

(57) ABSTRACT

The invention relates to an electrode unit for an electrochemical device, comprising a solid electrolyte (3) and a porous electrode (7), the solid electrolyte (3) dividing a compartment for cathode material and a compartment for anode material and the porous electrode (7) being extensively connected to the solid electrolyte (3), with a displacer (23) being accommodated in the anode material compartment, where the displacer (23) is manufactured from a stainless steel or from graphite foil and bears resiliently against the internal geometry of the solid electrolyte (3) in such a way that the displacer (23) does not contact the solid electrolyte over its full area, or with the displacer comprising an outer shell (62) of stainless steel or graphite, and a core (64) of a nonferrous metal, the nonferrous metal being thermoplastically deformable at a temperature which is lower than the temperature at which the stainless steel is thermoplastically deformable, and where for production the shell (62) of stainless steel or graphite is pressed onto the solid electrolyte (3) by introduction and heating of the (Continued)

Figure 1:
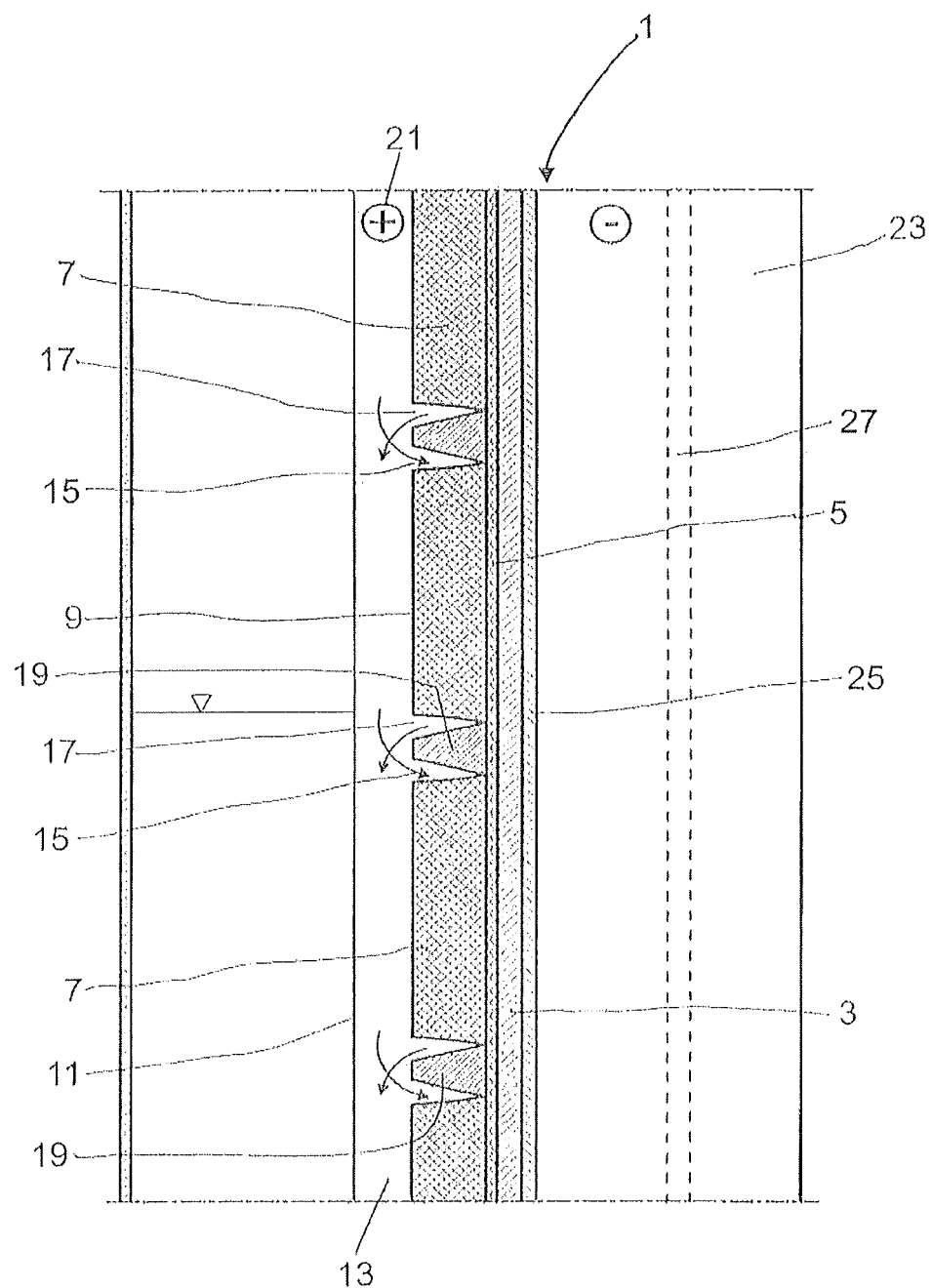

nonferrous metal, and on cooling forms a gap between solid electrolyte (3) and shell (62) of stainless steel.

21 Claims, 9 Drawing Sheets

(51) Int. Cl.
| | |
|---|---|
| *C25B 13/02* | (2006.01) |
| *H01M 4/38* | (2006.01) |
| *C25B 13/04* | (2006.01) |
| *H01M 4/58* | (2010.01) |
| *H01M 10/39* | (2006.01) |
| *H01M 2/02* | (2006.01) |
| *H01M 4/02* | (2006.01) |

(52) U.S. Cl.
CPC ............. *H01M 4/38* (2013.01); *H01M 4/381* (2013.01); *H01M 4/58* (2013.01); *H01M 10/3909* (2013.01); *H01M 10/3945* (2013.01); *H01M 10/3954* (2013.01); *H01M 2/0252* (2013.01); *H01M 2004/025* (2013.01)

(58) Field of Classification Search
CPC ...... H01M 4/58; H01M 4/381; H01M 2/1673; H01M 2/18; H01M 4/38; H01M 2/0252; H01M 2004/025
See application file for complete search history.

(56) References Cited

U.S. PATENT DOCUMENTS

| | | | |
|---|---|---|---|
| 3,915,741 A | 10/1975 | Kogiso et al. | |
| 3,922,176 A * | 11/1975 | Robinson | H01M 6/20 429/320 |
| 3,966,492 A | 6/1976 | Ludwig | |
| 3,980,496 A | 9/1976 | Ludwig et al. | |
| 4,037,027 A | 7/1977 | Desplanches et al. | |
| 4,038,465 A | 7/1977 | Ludwig et al. | |
| 4,041,216 A | 8/1977 | Desplanches et al. | |
| 4,102,042 A * | 7/1978 | Weiner | H01M 10/3909 29/623.2 |
| 4,268,587 A * | 5/1981 | Farrington | H01M 10/3909 429/320 |
| 4,510,681 A | 4/1985 | Anand et al. | |
| 4,576,881 A | 3/1986 | Hasenauer et al. | |
| 4,895,777 A | 1/1990 | Kagawa | |
| 5,320,915 A | 6/1994 | Ali et al. | |
| 5,554,457 A | 9/1996 | Bugga et al. | |
| 2008/0053837 A1 | 3/2008 | Huber et al. | |
| 2011/0027624 A1 | 2/2011 | Deane et al. | |
| 2011/0163258 A1 | 7/2011 | Seeler et al. | |
| 2011/0247606 A1 | 10/2011 | Major et al. | |
| 2011/0260100 A1 | 10/2011 | Trukhan et al. | |
| 2011/0271953 A1 | 11/2011 | Wortmann et al. | |
| 2012/0040262 A1 * | 2/2012 | Ubler | H01M 8/1009 429/418 |

FOREIGN PATENT DOCUMENTS

| | | |
|---|---|---|
| DE | 2603404 A1 | 8/1976 |
| DE | 2610222 A1 | 10/1976 |
| DE | 2635900 A1 | 5/1977 |
| DE | 2927868 A1 | 1/1980 |
| EP | 116690 A1 | 8/1984 |
| EP | 0213828 A1 | 3/1987 |
| EP | 0 553 400 A1 | 8/1993 |
| GB | 2030349 A | 4/1980 |
| JP | 63202865 A | 8/1988 |
| JP | 05266919 | 10/1993 |
| JP | 08329981 | 12/1996 |
| JP | 10270073 | 10/1998 |
| JP | 2000251931 A | 9/2000 |
| JP | 2001 118598 A | 4/2001 |
| JP | 2002-184456 A | 6/2002 |
| WO | WO-2010/112466 A1 | 10/2010 |
| WO | WO2010112466 * | 10/2010 |
| WO | WO-2011/020560 A1 | 2/2011 |
| WO | WO-2011/083054 A1 | 7/2011 |
| WO | WO-2011/124510 A1 | 10/2011 |
| WO | WO-2011/138270 A1 | 11/2011 |
| WO | WO-2011161072 A1 | 12/2011 |

* cited by examiner

ELECTRODE UNIT

CROSS-REFERENCE TO RELATED APPLICATIONS

This application claims benefit (under 35 USC 119(e)) of U.S. Provisional Application 61/657,915, filed Jun. 11, 2012, which is incorporated by reference.

The invention relates to an electrode unit for an electrochemical device, comprising a solid electrolyte and a porous electrode, the solid electrolyte dividing a compartment for cathode material and a compartment for anode material and the porous electrode being extensively connected to the solid electrolyte and the cathode material flowing along the electrode during charging or discharging.

Electrochemical devices can be used for example to store electrical energy. Said devices are generally referred to as batteries or accumulators. Other examples of electrochemical devices are electrolysis cells. The latter can be used for example to prepare alkali metals from suitable salts comprising alkali metals.

Generating electrical energy by means of fossil fuel-fired power stations is associated with the production of $CO_2$ and thus has a considerable impact on the greenhouse effect. Generating energy from renewable energy sources, for example wind, sun, geothermal energy or hydroelectric power, avoids this disadvantage. However, these renewable energy sources are not always available at the times they are required by load profiles. In addition, the energy is often generated at locations which differ from the places where the energy demand is located. If this systemic disadvantage is to be overcome, the energy generated must be stored, buffered and possibly even transported.

Against this background, it is not possible to base a stable power grid solely on renewable energy sources. There is accordingly a need to compensate and buffer such fluctuations by highly effective systems which are inexpensive and energy-efficient.

Electrical energy is currently stored on an industrial scale using pumped-storage power stations in which the potential energy arising from the geodetic difference in height of the water is utilized for conversion into electricity. However, the construction of such pumped-storage power stations is restricted by topographic and environmental considerations. Pressure storage power plants, which make use of air compression for storing energy, are limited by their comparatively low efficiency. Other forms of energy storage, such as supercapacitors or flywheels are intended for other target markets, in particular short-term storage. Electrical energy may in particular be stored using batteries, various designs of which have been implemented industrially. In particular, it is necessary to use batteries which are rechargeable for this purpose.

Corresponding batteries which function on the basis of a molten alkali metal as anode and a cathodic reaction partner, generally sulfur, are known for example from DE-A 26 35 900 or DE-A 26 10 222. The molten alkali metal and the cathodic reaction partner are divided by a solid electrolyte which is permeable to cations. The alkali metal reacts with the cathodic reaction partner on the cathode. For example when using sodium as the alkali metal and sulfur as the cathodic reaction partner, the reaction is of sodium and sulfur to form sodium polysulfide. The battery is charged by splitting the sodium polysulfide on the electrode back into sodium and sulfur by applying electrical energy.

The storage capacity of batteries based on a molten alkali metal and a cathodic reaction partner is increased by using batteries in which the quantity of reactants used in increased by additional storage vessels. The liquid sodium is supplied to the solid electrolyte for discharging. The liquid sodium simultaneously acts as anode and forms cations which are transported to the cathode through the cation-conductive solid electrolyte. At the cathode, the sulfur flowing to the cathode is reduced to polysulfide, i.e. is reacted with the sodium ions to yield sodium polysulfide. The corresponding sodium polysulfide may be collected in a further vessel. It is alternatively also possible to collect the sodium polysulfide together with the sulfur in the vessel around the cathode compartment. Due to the difference in density, the sulfur rises up and the sodium polysulfide settles out. This difference in density may also be exploited to bring about flow along the cathode. A corresponding battery design is described, for example, in WO 2011/161072.

In batteries which operate using a redox-system based on sodium and sulfur, electrical energy may be obtained on reacting sodium and sulfur to yield sodium polysulfide at a high level of efficiency of roughly 90%. The battery is charged by reversing the procedure by introducing electricity and cleaving the sodium polysulfide into sulfur and sodium. Since all the electrochemical reactants are in molten form and the ideal conductivity range of the ion-conductive ceramic membrane is not achieved until relatively high temperatures, the operating temperature of such a battery is conventionally approx. 300° C.

The solid, sodium ion-conductive electrolyte used in the battery is conventionally $\beta$-alumina. As this is a ceramic, failure of the solid electrolyte cannot be ruled out. In such an event, an uncontrolled reaction between sodium and sulfur may occur, which due to its exothermic nature may lead to an undesired temperature rise in the battery. In order to keep the temperature rise as small as possible in such a case, it is known, for example from JP-A 10270073, to use a displacer of aluminum with which the compartment for the sodium on the sodium side of the solid electrolyte is restricted to a gap with a width of 0.01 to 0.2 mm. The gap is here produced by a combination of plastic deformation and elastic rebound upon injection of the displacer into the solid electrolyte which is conventionally of annular construction. The use of a displacer made of aluminum, however, leads to an uncontrollable reaction if the solid electrolyte becomes damaged. In that case there is initially a reaction between sodium and sulfur, leading to an increase in the temperature. This temperature rise may attain temperatures at which even the aluminum begins to react with the sulfur penetrating through the fracture. This reaction is exothermic and cannot be ended. This leads to a further rise in temperature and to thermal destruction first of the electrode and, depending on the construction of the battery, of the battery as a whole as well.

Besides the use of aluminum as material for the displacer, JP-A 05266919 and JP-A 08329981 also disclose the use of stainless steel.

Since the mechanical strength of stainless steel is greater than that of aluminum and hence the plastic deformation at battery operating temperature is very much lower, the stainless steel, with a cylindrical design of the displacer, is unable to conform to the shape of the solid electrolyte. Owing to thermal expansion, therefore, there may be a fracture of the solid electrolyte if the displacer made from stainless steel is pressed nonuniformly against the solid electrolyte. Such nonuniform pressing of the displacer onto the solid electrolyte results, for example, from manufacturing inaccuracies during the production of the ceramic solid electrolyte.

The object of the present invention was accordingly to provide an electrode unit having a displacer, which does not exhibit the disadvantages of the electrodes known from the prior art.

Said object is achieved by an electrode unit for an electrochemical device, comprising a solid electrolyte and a porous electrode, the solid electrolyte dividing a compartment for cathode material and a compartment for anode material and the porous electrode being extensively connected to the solid electrolyte, with a displacer (23) being accommodated in the anode material compartment, where the displacer (23) is manufactured from a stainless steel or from graphite foil and bears resiliently against the internal geometry of the solid electrolyte (3) in such a way that the displacer (23) does not contact the solid electrolyte over its full area, or with the displacer comprising an outer shell (62) of stainless steel or graphite, and a core (64) of a nonferrous metal, the nonferrous metal being thermoplastically deformable at a temperature which is lower than the temperature at which the stainless steel is thermoplastically deformable, and where for production the shell (62) of stainless steel or graphite is pressed onto the solid electrolyte (3) by introduction and heating of the nonferrous metal, and on cooling forms a gap between solid electrolyte (3) and shell (62) of stainless steel.

Through the use of a displacer made of stainless steel or a displacer with an outer shell made of stainless steel, in particular in the event of the fracture of the solid electrolyte, an uncontrolled thermal destruction of the battery as a whole is prevented, since the stainless steel reacts with the sulfur only at very much higher temperatures and less vigorously than does aluminum. Through this means it is possible to achieve a significant increase in the operational safety of such a battery operating on the basis of an alkali metal and sulfur. By virtue of the fact that the displacer bears resiliently against the internal geometry of the solid electrolyte, changes in length due to thermal expansion can be compensated.

For the purposes of the present invention, an anode material should be taken to mean a liquid reactant which is supplied to the anode side during discharging. The anode material is preferably electrically conductive, in particular a liquid alkali metal is used as the anode material. Suitable anode materials are for example lithium, sodium, potassium, in particular sodium or potassium.

The cathode material is a liquid reactant which is electrochemically reacted with the anode material. The cathode material conventionally forms a salt by chemical reaction with the anode material. Suitable cathode materials are for example sulfur or polysulfides. The cathode material is here used in liquid form. Also suitable as cathode material is a mixture of sodium chloride and a metal from transition group 8, as for example iron, nickel or cobalt, in combination with a liquid-melt electrolyte such as $NaAlCl_4$.

Other suitable cathode materials in conjunction with an alkali metal as anode material are, for example, oxides of nitrogen (NO or $NO_2$), halogen, as for example chlorine, iodine or bromine, a metal halide, for example $NiCl_2$ or $FeCl_3$, a metalloid halide, for example $SiCl_4$ or $Si_2Cl_6$. Also possible is the use of a solid salt which is able to change its redox potential. An example of such a salt is $NaFePO_4$.

Preference is given to gaseous cathode materials, the operating conditions—especially pressure and temperature—of the electrochemical apparatus being adaptable in such a way that the cathode material is in gaseous form. Thus, for example, it is possible, when using sulfur as cathode material, to supply the sulfur not only as a melt but also, alternatively, as sulfur vapor. To enhance the conductivity it is possible when using gaseous cathode materials to use a liquid electrolyte as well. This electrolyte must be compatible with the redox couple employed. When using sodium and sulfur, examples are alkali metal salts with sulfur oxygen anions such as sodium sulfite or sodium thiosulfate. When using alkali metal and nitrogen oxide, suitable examples are alkali metal nitrates and nitrites. When a halogen is employed it is possible to use complex salts of an alkali metal halide and a metal halide, for example $NaAlCl_4$ or $NaZnCl_3$.

An electrochemical apparatus for the purposes of the present invention is an apparatus for storing electrical energy, also termed as battery or accumulator, or an electrolysis cell.

Transport through the porous electrode preferably proceeds solely by convection and diffusion. In this way it is possible to dispense with pumps or similar devices providing forced transport. The disadvantage of such devices is generally that they require electricity which is then no longer available. A further disadvantage of forced transport devices is the wear they undergo.

One advantage of the use of a displacer is that the amount of liquid anode material can be reduced. When a displacer is used, the anode material flows in a compartment between the displacer and the solid electrolyte. Through the use of the displacer, the compartment in which the anode material is located is reduced to a gap or, depending on the design of the displacer, even to a plurality of small channels, through which the anode material can flow. The anode material may here for example be introduced via an annular gap at the end of the solid electrolyte or alternatively be supplied through a flow channel in the displacer. The anode material is preferably fed through a flow channel in the displacer.

With particular preference, the displacer or the outer shell of the displacer is made from special steel. Suitable special steels are in particular molybdenum-stabilized special steels 1.4571, 1.4401, 1.4404, 1.4405 and 1.4539. Furthermore, the displacer is preferably made from special steel sheet.

Loading of the solid electrolyte is additionally minimized by using special steel sheet with a thickness in the range from 0.05 to 0.5 mm, preferably in the range from 0.07 to 0.15 mm, for example 0.1 mm, to make the displacer.

In order to obtain a shape which rests resiliently against the internal geometry, the displacer preferably comprises an outer contour with projections and recesses. The projections and recesses may be obtained, for example, by a corrugated or zig-zag-shaped design of the displacer.

If the displacer comprises an outer shell of stainless steel or graphite and a core of a nonferrous metal, the outer shell of stainless steel or graphite, in a first embodiment, is a flexible foil of stainless steel or graphite. In a second, alternative embodiment, the outer shell comprises a cylindrically bent metal sheet whose edges overlap in axial direction. The outer shell may additionally be coated. Thus, for example, it is possible to use graphite-coated stainless steel for the outer shell. The graphite in this case may be present in the form of a graphite felt. An alternative possibility is to use graphite felt as material for the outer shell.

If the outer shell comprises a cylindrically bent metal sheet whose edges overlap in axial direction, it is further preferred if a base is included which, with an outwardly bent edge, surrounds the cylindrical bent metal sheet or which is surrounded by the cylindrically bent metal sheet, so that the base is movable relative to the outer shell for the production of the displacer.

In addition to the outer shell, the displacer, in a further embodiment, also has an inner shell, the displacer in this case being constructed as a hollow body. Located between the inner and outer shells of stainless steel or graphite is a core of the nonferrous metal.

Examples of suitable nonferrous metal for the displacer include aluminum, zinc or an alloy comprising at least one of these metals.

For the production of the displacer, the foil of stainless steel or graphite, or the cylindrically bent metal sheet, and optionally the base, are inserted into the solid electrolyte. In this context it is especially preferred if the foil or the cylindrically bent metal sheet and optionally the base bear against the solid electrolyte. Subsequently the nonferrous metal is introduced. Thereafter the nonferrous metal is heated together with the solid electrolyte and the stainless steel foil or the graphite foil to an extent such that it becomes plastically deformable, but is still not in liquid-melt form. An alternative possibility is to introduce a nonferrous metal blank which has already been heated.

An internal pressure is exerted on the nonferrous metal, so that the nonferrous metal presses the foil and optionally the base against the solid electrolyte. On cooling, the nonferrous metal undergoes shrinkage, and the foil or the cylindrically bent metal sheet and optionally the base adhere to the nonferrous metal, and so a gap is formed between the solid electrolyte and the foil or the cylindrically bent metal sheet and optionally the base made of stainless steel or graphite. This gap is sufficiently large for the molten alkali metal to be able to flow through the gap and come into contact with the solid electrolyte, allowing the electrochemical apparatus to be operated.

Besides the mode of production by insertion of a foil or a metal sheet for the outer shell and the subsequent introduction of the nonferrous metal, it is also possible to introduce a nonferrous metal blank coated with graphite or stainless steel into the solid electrolyte, to heat it, and then to press it against the solid electrolyte by application of an internal pressure. Heating in this case may take place before or after the introduction of the coated nonferrous metal blank.

Since special steel is only a moderately good electrical conductor, it is furthermore preferred for the displacer additionally to comprise current conducting means. The current conducting means ensure a uniform current supply both during charging and during discharging. Suitable current conducting means are for example preferably current collectors arranged uniformly over the circumference of the displacer, which current collectors are made in a preferred embodiment from a special steel tube closed at both ends in which a core of an electrically highly conductive material is introduced.

The surface of the special steel tube here rests continuously against the core of electrically highly conductive material. The special steel tube protects the electrically highly conductive core from attack by sulfur and polysulfide in the event of failure of the solid electrolyte.

In an alternative embodiment, the current conducting means comprise a continuous or patterned coating of an electrically highly conductive material on the inside of the displacer.

Suitable electrically highly conductive materials for the current conducting means are for example copper, aluminum, silver or gold. If a current collector with a special steel tube is used, the electrically highly conductive material may also be sodium. While the sodium will indeed be liquid at a conventional operating temperature 300° C., it cannot escape due to the special steel tube. The electrically highly conductive material is particularly preferably copper or aluminum. In addition to the pure metals, mixtures or alloys which comprise at least one of said metals can also be used. However, particular preference is given to use in an unmixed or unalloyed state.

In order to ensure proper functioning of the electrode unit, the current conducting means must be connected highly electrically conductively to the displacer. When using current collectors, this may for example be achieved by in each case welding the current collectors to the displacer. It is preferred, however, to clamp the current collectors in recesses of the displacer. The current collectors are here preferably arranged on the outside of the displacer.

The current collectors may be firmly connected to the displacer for example by making the recesses omega-shaped with the diameter of the omega matching the external diameter of the wire. Given an appropriate design of the recesses, the wires may in each case be clamped in the recesses with a stable connection and form a uniform contact with the displacer over their entire length.

If the displacer comprises an outer shell and a core made from nonferrous metal, it is possible to utilize the nonferrous metal core for the purpose of current conduction.

The electrode on the side of the solid electrolyte on which the compartment for the cathode material is located may be configured in a manner known from the prior art.

In order to achieve uniform functioning of the entire electrode, in particular in large electrochemical devices for storing electrical energy, hereinafter also designated "battery", in a preferred embodiment for large devices for electrochemical energy storage, the extensive tube or sheet metal wall has the structure of corrugated sheet metal, such that alternate, perpendicularly oriented lengthwise channels are formed between the boundary of the porous electrode material and the corrugated sheet metal-like tube or sheet metal wall, which lengthwise channels are, however, capable of communicating with the cavities of the electrode material. Convective flow driven by the difference in density, for example between polysulfide and sulfide, can develop in these lengthwise channels, said flow being directed upwards during charging and downwards during discharging.

In a further particularly preferred embodiment, the porous electrode material is subdivided into lengthwise segments, flow barriers being arranged between the lengthwise segments in order to force mass transfer of liquid cathode material between porous electrode and lengthwise channel.

In a further embodiment, the porous electrode segments are additionally encased by means of segment walls closed at the sides in order to force purposeful inflow into and outflow from the porous electrode. In this preferred embodiment, the segment wall comprises a plurality of rows of inlet openings and outlet openings oriented transversely of the direction of flow, the inlet openings and outlet openings alternating in the direction of flow and flow barriers being accommodated in the porous electrode, in each case in the direction of flow, upstream of the inlet openings and downstream of the outlet openings.

During discharging of the battery, i.e. when releasing electrical energy, the cathode material enters through the inlet openings into the porous electrode and is electrochemically reacted with the anode material. The reaction product then emerges through the outlet openings. The flow barriers in the porous electrode ensure that the reaction product is forced to emerge at the outlet openings, such that the reaction product cannot flow onwards in the porous electrode. This allows cathode material to enter through inlet openings downstream of the outlet openings into the porous electrode where it can be reacted. In this way, the entire length of the electrode may be uniformly used for electrochemical reaction of the anode material with the cathode material.

In order to be able to utilize the entire surface area of the porous electrode, it is furthermore preferred for a row of outlet openings in each case immediately to be followed by a row of inlet openings. In this case, the optionally unreacted cathode material and the reaction product flow up to a flow barrier and pass out from the electrode through the outlet openings, and fresh cathode material, which is reacted with the anode material, is supplied to the porous electrode directly below the flow barrier.

In order to prevent reaction product which has formed in the porous electrode and emerges through the outlet openings from immediately entering the porous electrode again through the downstream inlet openings, it is furthermore preferred for the inlet openings which follow the outlet openings in the direction of flow of the cathode material to be arranged in a staggered manner relative to the outlet openings.

It is for example here possible to construct the inlet openings and the outlet openings in each case with a rectangular cross-section and to provide a web of the extensive electrode in each case between two adjacent inlet openings or two adjacent outlet openings in the width of the inlet openings or outlet openings respectively. In the case of the staggered arrangement, an inlet opening is in each case followed by the web between two outlet openings while an outlet opening is followed by the web between two inlet openings.

In addition to a design with rectangular inlet openings and outlet openings, it is also possible to construct the inlet openings and outlet openings in any desired other shape. These may accordingly be constructed for example in a circular, semicircular, elliptical, oval, triangular or polygonal shape with as many vertices as desired. A circular, semicircular or rectangular shape of the inlet openings and outlet openings is here preferred. It is also possible to provide inlet openings and outlet openings of different shapes, an identical shape of inlet openings and outlet openings being preferred.

According to the invention, the segment wall is electrically conductively connected to the porous electrode. During discharging of the device, the electrical voltage released during the electrochemical reaction of the anode material with the cathode material is conducted via the porous electrode to the segment wall and can be picked off from the segment wall. It is particularly preferred for this purpose for the segment wall to be electrically conductively connected to one or more bus conductors. In order to avoid the risk, arising from the nature of the material, of an undesired exothermic reaction of the current conductor with sulfur or polysulfide, in a preferred embodiment the bus conductors are made from highly conductive materials such as aluminum, copper or sodium jacketed or encased in special steel. The bus conductor may here also be provided in the form of a cover, which is preferably constructed such that the cover forms flow channels along the electrode. It is alternatively also possible to provide a cover which is constructed such that flow channels are formed along the electrode, to make the electrical contact through the cover and to arrange the bus conductor outside the cover. It is preferred, however, to construct the cover electrically conductively as a bus conductor. It is here furthermore preferred for the cover additionally to accommodate rod electrodes which are preferably made from an electrically highly conductive material which differs from the material of the cover. The rod electrodes may here for example lie outside on the cover or are enclosed by the material of the cover. The individual rod electrodes are here preferably arranged equidistantly in the cover. The rod electrodes may, for example, be arranged in each case between two flow channels. Alternatively, however, the rod electrodes may for example also be arranged in each case in the region of a flow channel.

In one particularly preferred embodiment, the cover is of corrugated construction in order to form the flow channels, the troughs in each case resting against the extensive electrode and the flow channels being formed by the corresponding peaks. In addition to a corrugated design, it is alternatively also possible, for example, to make the cover flat with webs, the flow channels in each case being formed between two webs and the webs resting against the extensive electrode to form the flow channels.

In one particularly preferred embodiment, the solid electrolyte is of cylindrical construction and the porous electrode encloses the solid electrolyte. In this case, the anode material is located in the interior of the cylindrically shaped solid electrolyte and the cathode material flows outside along the porous electrode. In a cylindrical design of the solid electrolyte, the segment wall is preferably formed by at least one sleeve which encloses the porous electrode. In this case, the inlet openings and outlet openings are formed in the sleeve. In order to ensure current flow from the porous electrode to the sleeve-type extensive electrode, the external diameter of the porous electrode here corresponds to the internal diameter of the sleeve. In this way, the sleeve rests extensively against the porous electrode.

If the segment wall is formed by just one sleeve, it is possible to form a plurality of rows of inlet openings and outlet openings in the sleeve. A design with a plurality of sleeves is preferred, however, the inlet openings and outlet openings in this case being formed in each case at the ends of a sleeve. To this end, it is for example possible in each case to shape the ends of the sleeve as a rectangular profile. In this case, the opposite rectangular profiles in a sleeve are constructed such that the recesses are in each case opposite one another. A plurality of sleeves are then successively placed on the electrode, the sleeves each being rotated relative to one another such that the recesses of one sleeve are opposite the projecting regions located therebetween. In this way, the inlet openings and outlet openings are formed by the recesses and the adjacent sleeve.

In the case of a cylindrically shaped solid electrolyte, the cover likewise preferably takes the form of a sleeve and is configured such that the channels are oriented in the axial direction along the porous electrode. It is here possible on the one hand to construct the cover as an annular sleeve which is provided with webs which divide the individual flow channels or the sleeve is of corrugated construction such that the peaks and troughs form the channels, the peaks in each case resting against the sleeves which form the segment walls. During discharging of the battery, the cathode material flows through the flow channels and in each case enters via inlet openings into the porous electrode and, after electrochemical reaction, emerges back out of the outlet openings as the reaction product. Due to the staggered arrangement of inlet openings and outlet openings, the material emerging from the outlet openings cannot immediately enter the porous electrode again through downstream inlet openings. In this way it is ensured that in each case sufficient unreacted cathode material reaches the porous electrode through the inlet openings.

In addition to the above-described embodiment, in which the inlet openings and downstream outlet openings are arranged directly one above the other and the flow channels are formed in the axial direction along the porous electrode, it is also possible for the flow channels to extend spirally. In the case of a flat electrode unit, the flow channels may extend obliquely. In this case, the arrangement of the inlet openings and outlet openings is preferably such that in each case in one flow channel an outlet opening follows an inlet opening and the inlet opening immediately downstream of the outlet opening is located in an adjacent flow channel. In this case too, a corresponding arrangement of the inlet openings and outlet openings ensures that the reaction product emerging from the outlet openings does not immediately enter the porous electrode again via downstream inlet openings.

In the above description, the directions of flow and transport paths of the anode material and cathode material were in each case stated for the discharge process in which current is generated. Transport proceeds in the opposite direction for charging the device for storing electrical energy. In this case, the reaction product arising during discharging is passed into the porous electrode through the outlet openings, reacted in the porous electrode to yield the anode material and cathode material and the cathode material passes through the inlet openings back out of the porous electrode and flows into a storage vessel. The cations formed during the charging process are transported through the solid electrolyte, take up an electron and are transported as neutral anode material through the flow channel in the displacer or through the annular feed device, through which the anode material flows during charging, back into a storage vessel.

The electrode unit according to the invention is in particular suitable for use in devices for storing electrical energy which are operated with an alkali metal as anode material. A suitable anode material is here for example lithium, sodium or potassium, preferably sodium or potassium. The device for storing electrical energy is here operated at a temperature at which the alkali metal used is in liquid form. Corresponding temperatures may be provided, for example, by simultaneously constructing the displacer present in the cylindrical solid electrolyte as a heating element, such that the latter may be used to keep the temperature in the electrode unit within a range in which the anode material is in liquid form. Since the anode material is a liquid metal, it is electrically conductive and may thus directly be used as an anode. All that is required for this purpose is to contact an electrical conductor through which the current can flow with the liquid anode material.

The cathode material used is a material which is capable of reacting chemically with the anode material. Sulfur or polysulfide is preferably used as the cathode material.

In a preferred embodiment, a ceramic is used as the solid electrolyte. β-Alumina or β"-alumina is particularly suitable as a material for the solid electrolyte. This is preferably stabilized, for example with MgO or $Li_2O$.

As an alternative to β-alumina or β"-alumina, other ceramic materials may also be used as the solid electrolyte. The ceramic known as NASCION®, the composition of which is stated in EP-A 0 553 400, may for example be used. Sodium ion-conductive glasses or zeolites and feldspas may also be used as an alternative to ceramics. In particular, however, sodium β"-alumina, sodium βalumina or sodium β/β"-alumina are preferred. The sodium ion-conductive ceramics are preferably thin-walled tubes closed at one end at the bottom and open at the top if the solid electrolyte is of cylindrical construction. In this case, it is furthermore preferred for the tubes to have a diameter of 20 to 50 mm and a length in the range from 0.5 m to 2 m. The wall thickness is preferably in the range from 0.5 mm to 3 mm, in particular in the range from 1.5 mm to 2 mm.

The porous electrode is made from a material which is inert towards the substances used in the electrochemical reaction. Carbon, in particular in the form of graphite, is for example suitable as the electrode material.

According to the invention, the electrode is porous so that the substances participating in the electrochemical reaction can flow through it. This is achieved, for example, in that the material of the porous electrodes assumes the form of a felt or nonwoven. The electrode is very particularly preferably a graphite felt electrode.

In order to avoid the electrode coming into direct contact with the solid electrolyte, a porous liquid electrolyte-filled layer which is insulating in terms of electron conduction is arranged between the porous electrode and the solid electrolyte. For the purposes of the present invention, "insulating in terms of electron conduction" should be taken to mean a material which exhibits a specific resistance of at least $10^8$ Ohm*cm and in particular of at least $10^9$ Ohm*cm. The material for the insulating layer should here be selected such that cations which are transported through the solid electrolyte can also pass through the insulating layer to the porous electrode while electron conductivity is negligibly small. Examples of a suitable electrically insulating material which is arranged between the solid electrolyte and the electrode are anodized or sulfide-passivated aluminum fabric, ceramic fibers, glass fibers or carbon fabric. Using the electrically nonconductive material ensures that nonconductive cathode material, for example sulfur, is not deposited on the solid electrolyte, so limiting current flow during charging.

The segment wall, via which the porous electrode is current-conductively connected to the bus conductor, is preferably made from a metallic material, in particular from steel. Suitable steels are the same as those which may also be used for the displacer.

If the segment wall is made from a steel, it is preferred, as with the displacer, for additional current conducting means to be included. Since the segment wall is in contact with sulfur and polysulfide on both sides, coating with an electrically highly conductive material is not possible here. The current conducting means used here are therefore preferably current collectors made from a special steel tube closed at both ends and with an electrically highly conductive core, as were described above in relation to the displacer. Using the current conducting means improves the electrical conductivity of the electrode. In a particularly preferred embodiment, the special steel tube of the bus conductor is additionally chromium-plated.

As likewise with the displacer, it is preferred to arrange the electrically conductive wires with a clamp connection in troughs of the extensive electrode which is of corrugated construction.

The cover which forms the channels is likewise preferably made from an electrically conductive material and, in a particularly preferred embodiment, simultaneously serves as the bus conductor. It is alternatively also possible to provide the bus conductor outside the cover. The cover is preferably likewise made from a metallic material, for example from steel. The same material as for the segment wall is preferably used here.

Exemplary embodiments of the invention are illustrated in the figures and explained in more detail in the following description.

Figure 2:
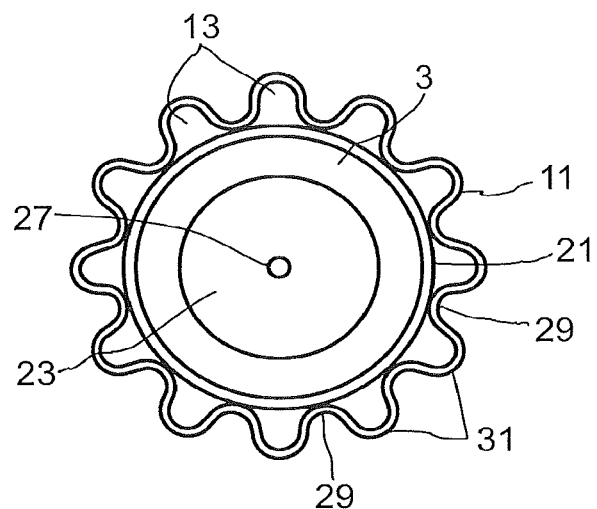
Figure 3:
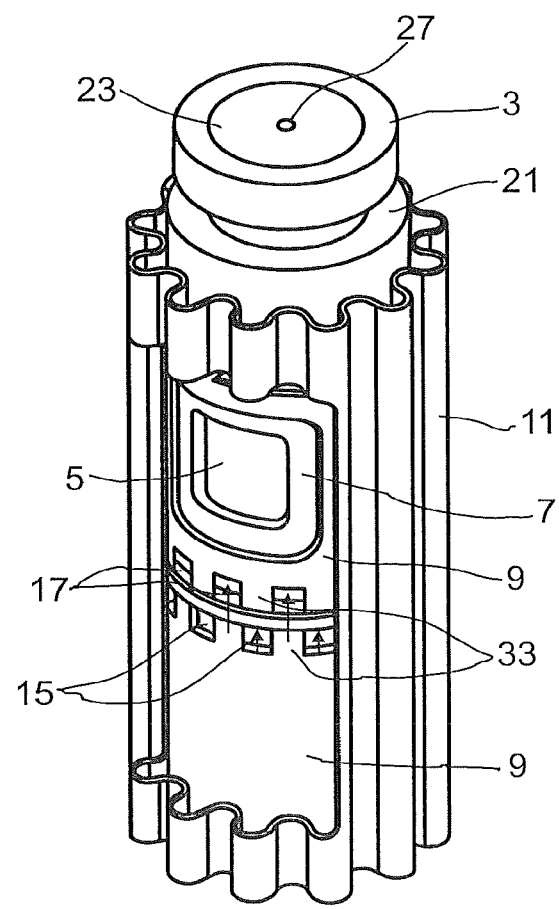
Figure 4:
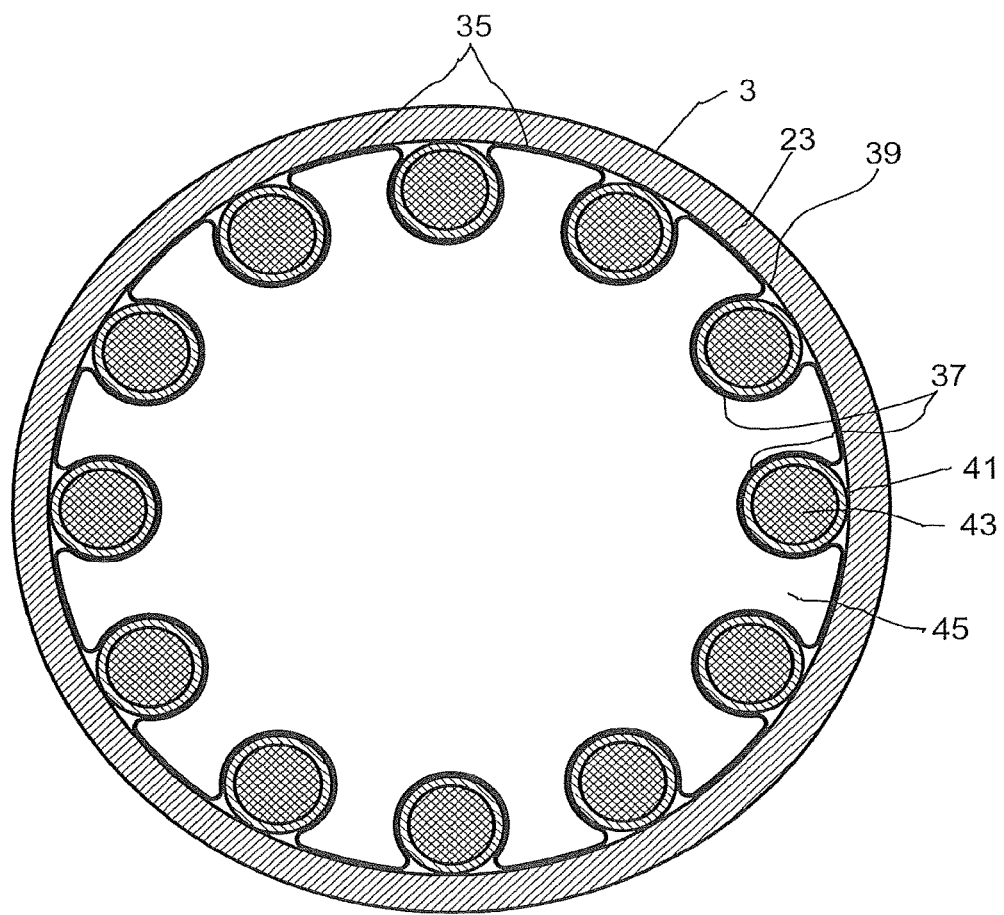
Figure 5:
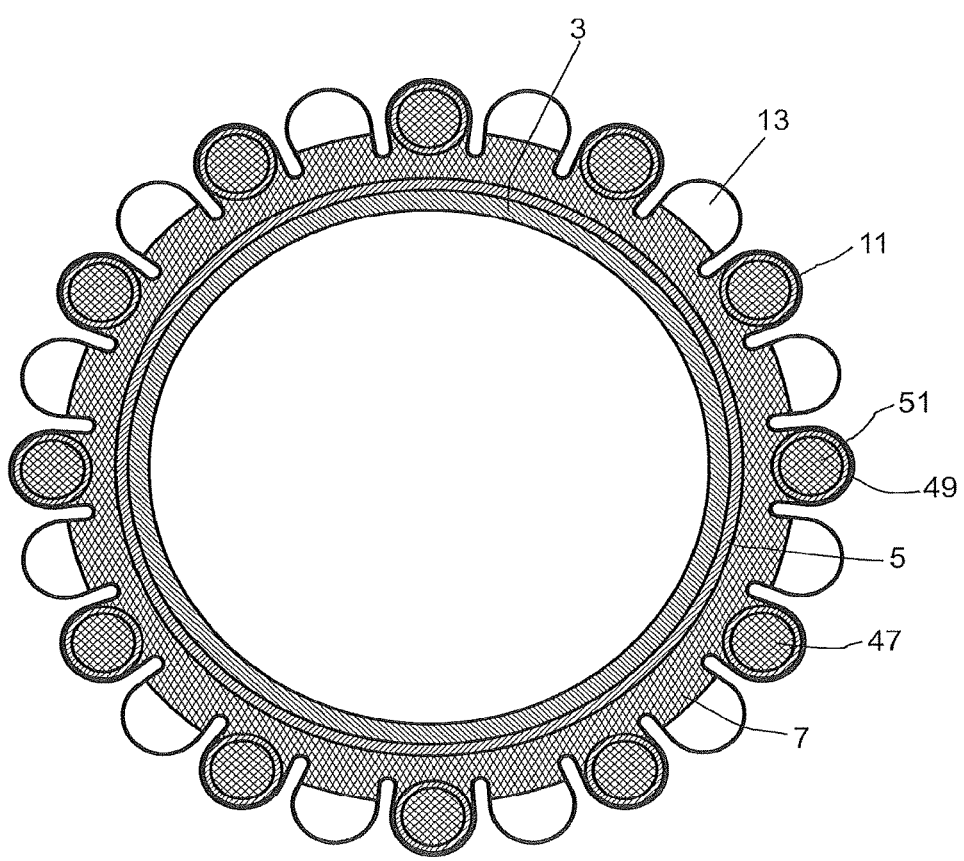

In the drawings:

FIG. 1 shows a sectional representation through an electrode unit constructed according to the invention, FIG. 2 shows a plan view of an electrode unit constructed according to the invention with a segment wall, FIG. 3 shows a three-dimensional representation of the electrode unit according to the invention with a segment wall, FIG. 4 shows a sectional representation of a displacer constructed according to the invention, FIG. 5 shows a sectional representation of an extensive electrode configured according to the invention.

Figure 6:
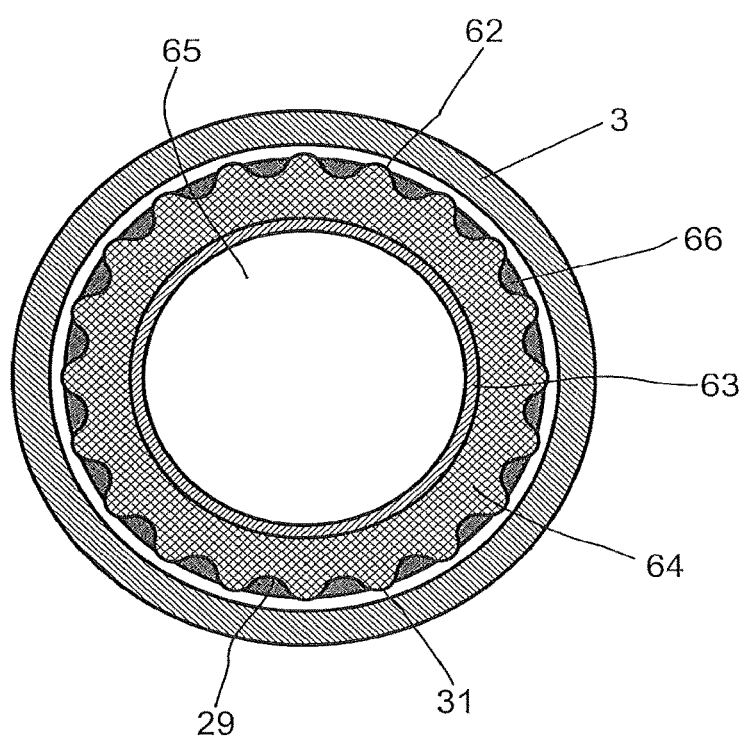
Figure 7:
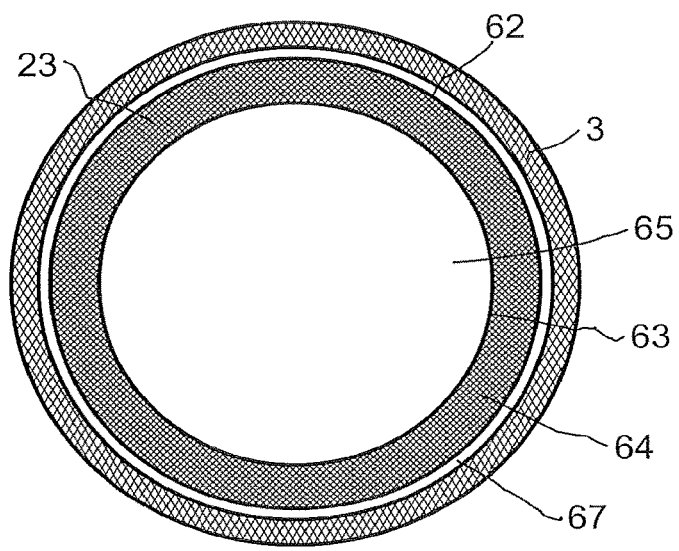
Figure 8:
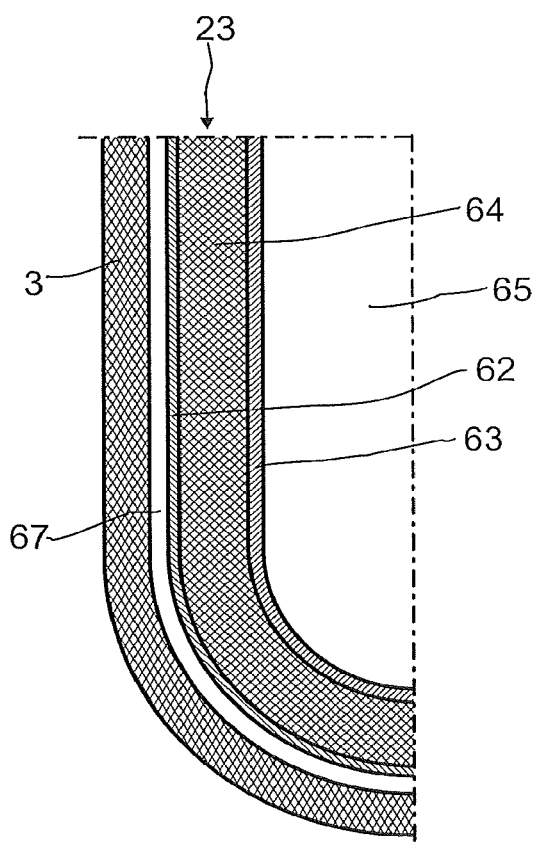
Figure 9:
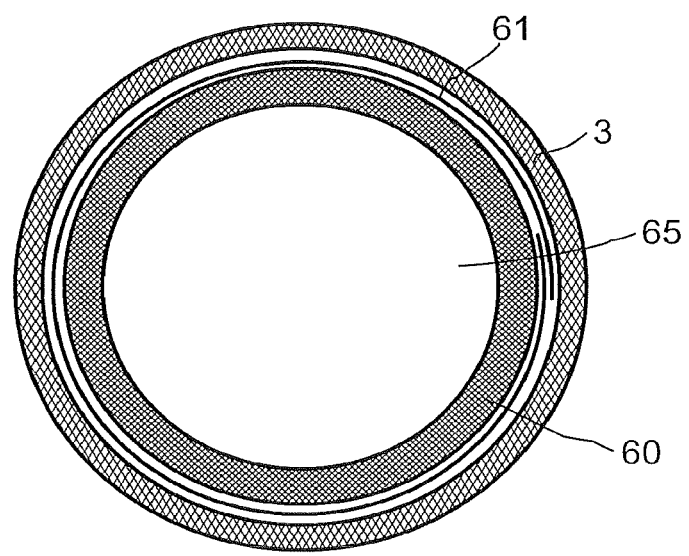
Figure 10:
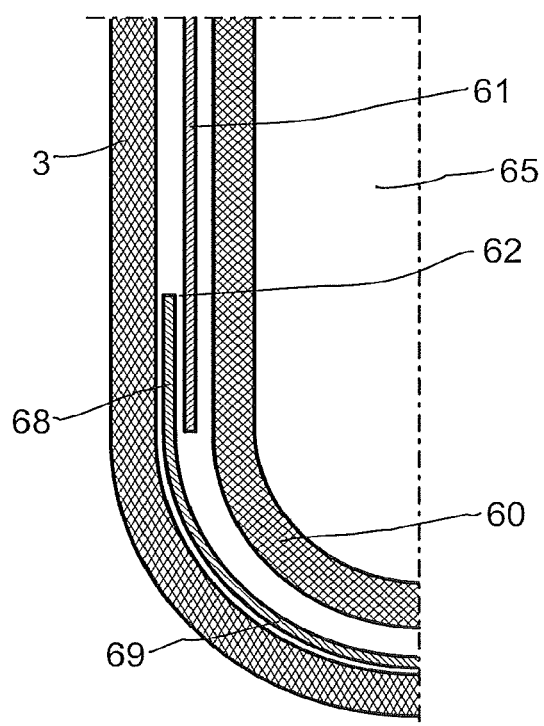

FIG. 6 shows a displacer constructed according to the invention in a second embodiment, FIG. 7 shows a displacer constructed according to the invention in a third embodiment, FIG. 8 shows the displacer according to FIG. 7 as a longitudinal section, FIG. 9 shows the structure of the displacer in an embodiment with cylindrically bent metal sheet as a shell before injection with the core, FIG. 10 shows the structure of the displacer with cylindrically bent outer shell and base before injection with the core.

FIG. 1 shows an electrode unit according to the invention in the form of a longitudinal section.

An electrode unit 1 comprises a solid electrolyte 3, which in the embodiment shown here is of cylindrical construction and is closed at one end. The solid electrolyte 3 is generally a ceramic membrane which is permeable to specific cations. As described above, β"-alumina is for example suitable as a material for the solid electrolyte 3.

The solid electrolyte 3 is adjoined by an interlayer 5 which is insulating in terms of electron conduction. The interlayer 5 which is insulating in terms of electron conduction is for example a passivated aluminum fabric, for example an anodized or sulfide-passivated aluminum fabric, or carbon fabric or is made up of ceramic fibers or glass fibers. It is alternatively also possible to apply a special coating to the porous electrode as the interlayer 5 which is insulating in terms of electron conduction. In the present context, insulating in terms of electron conduction means that the specific resistance of the layer is greater than $10^8$ Ohm*cm, preferably greater than $10^9$ Ohm*cm and in particular greater than $2 \times 10^9$ Ohm*cm.

The interlayer 5 which is insulating in terms of electron conduction is enclosed by a porous electrode 7. The porous electrode 7 is for example made from a graphite felt. In a preferred embodiment, as shown in FIGS. 2 and 3, the porous electrode 7 is enclosed by a segment wall 9. In the embodiment shown here with a cylindrical solid electrolyte 3, the segment wall 9 takes the form of a sleeve.

The segment wall 9 is adjoined by a cover 11. In the embodiment shown here, the cover 11 takes the form of a cladding tube which has a corrugated cross-section. In this way, the cover 11 constructed in the form of a cladding tube rests in each case with the troughs against the segment wall 9 and, with the peaks, forms channels 13 along the segment wall 9. During charging or discharging, cathode material flows through the channels 13. As has already been described above, the cathode material is for example sulfur or an alkali metal polysulfide.

In the embodiments shown in FIGS. 2 and 3, when the electrode unit 1 is in operation, during discharging the cathode material flows out of the flow channel 13 through inlet openings 15 into the porous electrode 7 where it is reduced electrochemically to the anion. The anion reacts with the cations likewise transported through the solid electrolyte 3 into the porous electrode 7 to form a salt. The cations are particularly preferably alkali metal ions, such that an alkali metal salt, in particular an alkali metal polysulfide, very particularly preferably sodium polysulfide, is formed in the porous electrode 7. The reaction product formed in the porous electrode 7, for example the alkali metal polysulfide, emerges via outlet openings 17 back out of the porous electrode 7 into the flow channel 13.

The number of sleeves used for the segment wall 9 here depends on the height of the sleeve and the length of the electrode unit and may also be greater than the number shown here. It is also possible to provide only one sleeve and to form a plurality of rows of inlet openings 15 and outlet openings 17 in the sleeve.

In order to be able to output a constant electrical power irrespective of the state of discharge, the porous electrode 7 is segmented by flow barriers 19. The flow barrier 19 prevents the reaction product which has formed in the porous electrode 7 from continuing to flow onwards through the porous electrode 7 in the region of the outlet openings 17. The flow barrier 19 ensures that all the material emerges from the porous electrode 7 into the flow channel 13 in the region of the outlet opening 17. This ensures fresh cathode material is supplied to the porous electrode 7 in a downstream segment, so improving the performance of the electrode unit 1. So that material which has emerged from an outlet opening 17 does not immediately enter the next segment of the porous electrode, the inlet openings 15 downstream from the outlet openings 17 are arranged in a staggered manner relative to the outlet openings 17.

The current released during discharging is picked off via a current terminal 21. To this end, the respective segments of the porous electrode 7 are contacted with the current terminal 21. Contact is made, for example, via the segment wall 9 and the cover 11. Both the segment wall 9 and the cover 11 are here of electrically conductive construction. It is alternatively also possible in each case to connect the porous electrodes 7, which are enclosed by the segment walls 9, to a central conductor which is contacted with the current terminal 21. Any other possible way known to a person skilled in the art of electrically contacting the porous electrode 7 is also possible.

In the simplified embodiment shown in FIG. 5, the structure comprises no segment walls. The porous electrodes 7 are in direct contact with the corrugated cover 11, such that in this case too vertically directed flow channels 13 are formed. The current supply lines are in direct electrical contact with the porous electrode 7.

During discharging, the porous electrode 7 is the cathode. The anode is formed by the anode material which is located on the opposite side of the solid electrolyte 3 from the porous electrode 7. In the embodiment shown here with a cylindrical solid electrolyte 3, the anode material is located in the interior of the solid electrolyte 3. In order to be able to keep the quantity of anode material small, a displacer 23 is located in the solid electrolyte 3. The displacer 23 is here constructed such that a gap 25 is provided between the solid electrolyte 3 and the displacer 23. The anode material is located in the gap 25. If an alkali metal is used as the anode material, the anode material is itself electrically conductive and may be used directly as an electrode, during discharging, as the anode. To this end, it is for example possible for the displacer 23 to be electrically conductive and the displacer 23 to form the current terminal.

A channel 27 is constructed in the displacer 23 for feeding the anode material. The anode material flows through the channel 27 into the gap 25 and, on electrochemical reduction, forms cations which pass through the cation-conductive solid electrolyte 3 into the porous electrode 7 where the cations enter into a neutralization reaction with the anions formed therein.

It is furthermore possible to heat the displacer 23 in order to establish the temperature required for operation so that the anode material and cathode material remain molten. Heating may be provided electrically for example with a heating rod.

In one particular embodiment, heating is provided with variable heating power distributed over the length of the electrode unit, such that more heating is provided at the top and the least at the bottom. This means that alkali metal which has cooled to below the melting point and the surrounding cathode material melt from above downwards in the form of a melt cone so ensuring that destructive pressures cannot arise due to entrapped melt.

For charging, the salt, for example sodium polysulfide, is supplied via the channels 13, enters through the outlet openings 17 into the porous electrode and is split by an applied voltage into sodium ions and sulfur, wherein the sodium ions can flow through the solid electrolyte 3 into the gap 25 and emerge through the channel 27. The sulfur passes out of the porous electrode 7, through the inlet openings 15 in the segment wall 9, into the flow channel 13. Flow is initiated by the difference in density between sodium polysulfide and sulfur. Since the sodium polysulfide has a higher density than sulfur, the sodium polysulfide sinks downwards and forms a flow, such that the electrode unit 1 may be continuously operated provided that a supply of alkali metal and sulfur is available.

The sulfur and alkali metal are stored in storage vessels arranged separately from one another, wherein the storage vessel for the sulfur may for example also enclose the cover 11 and flows via the channels 13 formed by the cover 11 to the porous electrode 7. The resultant salt is then likewise collected in the storage vessels for sulfur. Due to the difference in density, a biphasic system forms, the sodium polysulfide being located below and the sulfur on top.

FIG. 2 shows a plan view of the electrode unit 1 constructed according to the invention. The plan view shown in FIG. 2 in particular reveals the corrugated design of the cover 11 in the form of a cladding tube. The corrugated cover 11 here rests with troughs 29 against the segment wall 9 and individual channels 13 are formed by the peaks 31, which alternate with the troughs 29. During discharging, the cathode material flows into the channels 13, which are formed by the peaks 31, and then enters through inlet openings 15 into the porous electrode. The material which does not pass into the porous electrode 7 flows onward through the flow channel 13. At the outlet openings 17, the material flowing through the channel mixes with the emerging material, such that a mixture enters into downstream inlet openings 15 in the same flow channel 13, which mixture comprises a higher proportion of unreacted cathode material than the material emerging from the outlet openings.

FIG. 3 shows the electrode unit according to the invention in three dimensions, the cover 11 having a cutaway to show the underlying components. Said cutaway is not present in the installed electrode unit 1. The representation in FIG. 3 reveals that the outlet openings 17 are arranged in a staggered manner relative to the downstream inlet openings 15. This prevents material from an outlet opening 17 from being able to flow directly into the downstream inlet opening 15. In the embodiment shown here, the inlet openings 15 and outlet openings 17 are in each case constructed with a rectangular cross-section, an extension 33 of the extensive electrode 9 constructed as a sleeve in each case being located between two inlet openings 15 or two outlet openings 17, which extension is respectively of the same width as the downstream inlet opening 15 or the preceding outlet opening 17.

In the embodiment shown here, the extensive electrodes 9 are made as separate sleeves which in each case comprise the inlet openings 15 at one end and the outlet openings 17 at the other end. Design as individual sleeves facilitates installation and production. Alternatively, however, it is also possible to provide only one sleeve in which inlet openings 15 and outlet openings 17 are formed. The design with separate sleeves, the ends of which respectively comprise inlet openings 15 and outlet openings 17, is preferred however. In one particularly preferred embodiment, the inlet openings 15 and the outlet openings 17 on one sleeve are in each case in axial alignment with one another. It is furthermore also possible, in addition to the rectangular inlet openings 15 and outlet openings 17 shown here, to construct the inlet openings and outlet openings in any other desired shape. The openings may accordingly, for example, be constructed in the form of a semicircle or a semiellipse or even as a triangle, if the openings are in each case at the end of the sleeve. If only one extensive electrode is provided, in which a plurality of rows of inlet openings 15 and outlet openings 17 are constructed, said openings may also be constructed in any other desired shape, for example elliptical, circular, triangular or polygonal with as many vertices as desired.

In addition to the embodiment shown here with a cylindrical solid electrolyte 3 and thus likewise cylindrical porous electrodes 7, it is also possible to construct the electrode unit 1 with any other desired cross-section and also as an extensive electrode unit. Preferably, however, the electrode unit 1 is cylindrical, as shown here.

In order to create a longer electrode unit 1, more than the two segment walls 9 constructed as a sleeve which are shown here may be provided.

FIG. 4 shows a sectional representation through a displacer constructed according to the invention.

The displacer 23 is preferably made from special steel. In order to avoid damaging the solid electrolyte 3 by thermal expansion of the displacer 23, the displacer 23 is preferably configured such that it rests resiliently against the solid electrolyte 3. Resting in a resilient manner against the solid electrolyte may for example be achieved by a design with projections 35 and recesses 37. This results for example in a corrugated design of the displacer 23. The fact that the displacer 23 rests in a resilient manner enables manufacturing deviations of the inner contour of the solid electrolyte 3 and differences in the thermal expansion to be compensated. It is furthermore also possible, in particular, if additional current conductors 39 are provided, to make the recesses 37 omega-shaped, into which current conductors 39 with a circular cross-section are clamped.

In the embodiment shown here, the current conductors 39 comprise a jacket in the form of a tube 41 closed at both ends and a core 43 of an electrically highly conductive material. The entire circumference of the core 43 here rests against the tube 41. As has already been described above, the tube is preferably made from a special steel and the core is of aluminum, copper, silver, gold or sodium. Using the current conductors 39 improves the electrical conductivity of the displacer 23 made from special steel which has comparatively poor conductivity. The use of the tube 41 made of special steel protects the current conductor 39 against corrosion and, in the case of failure of the solid electrolyte 3, against a severe reaction with the cathode material.

The displacer is conventionally hollow on the inside. The internal region 45 of the displacer may for example be used to accommodate a vessel comprising sodium. The vessel is here preferably likewise made from special steel.

FIG. 5 shows a sectional representation of the extensive electrode in one embodiment of the invention.

The solid electrolyte 3 is enclosed by an electrically insulating layer 5 and a porous electrode 7. The porous electrode 7 is adjoined by the cover 11 which, in the embodiment shown here, is of corrugated construction. Flow channels 13, through which sulfur and polysulfide flow, are formed by the corrugated design of the cover 11.

If the cover 11 is made from steel, additional current conductors 47 should be provided to improve electrical characteristics. The current conductors 47 are here preferably arranged on the side of the cover 11 which faces towards the solid electrolyte 3. In the embodiment shown here, the current conductors 47 are accommodated in flow channels 23 of the extensive electrode. The geometries of the flow channels 23 and current conductors 47 are here adapted to one another such that a current conductor 47 in each case rests continuously against the wall of a flow channel 13. In order to avoid an unwanted reaction of the current conductor with the sulfur or polysulfide, the current conductor 47, like the current conductor 39 arranged on the displacer side, is made with a jacket of a special steel tube 49 closed at both ends and a core 51 of an electrically highly conductive material. The electrically highly conductive material is preferably copper, aluminum, silver or gold, particularly preferably copper or aluminum.

In addition to being arranged in every other flow channel 13, as shown here, any other desired uniform or nonuniform distribution of the current conductor 39 is possible. For example, in the case of a uniform distribution it is accordingly also possible to provide the current conductors only in every third or every fourth flow channel 13.

In addition to the embodiment shown here, it is furthermore also possible to arrange current conductors on the side of the cover 11 remote from the solid electrolyte 3. In this case, it is preferred to contact the electrically highly conductive material directly with the material of the cover 11, for example by a coating or also by a clamp connection of a wire made from the electrically highly conductive material in a trough of the cover 11 of corrugated construction that is remote from the solid electrolyte 3. In order to prevent reaction of the electrically highly conductive material with sulfur or polysulfide, a cover, which is not shown here, in this case encloses the extensive electrode and thus also the electrically highly conductive material. The same cover material is here preferably selected as for the cover 11.

FIG. 6 shows a displacer in a second embodiment. In this case the displacer comprises an outer shell 62 made from a stainless steel, the outer shell bearing resiliently against the solid electrolyte 3. For this purpose the outer shell, in the embodiment shown here, has a wave-form design with wave troughs 29 and wave peaks 31 in alternation. This form of the outer shell is suitable for compensating manufacturing deviations in the internal contour of the solid electrolyte and for compensating differences during thermal expansion. On the internal side, the outer shell 62 is followed by a core 64 made from a nonferrous metal and by an inner shell 63 made from stainless steel. The core here may, for example, be cast between the inner shell 63 and the outer shell 62 during production. This takes place preferably within the solid electrolyte 3, so that the displacer 23 is conformed to the contour of the solid electrolyte 3. Examples of suitable nonferrous metal for the core 64 include aluminum, zinc, copper or alloys comprising at least one of these metals. It is preferred, furthermore, for the core 64 to be utilized for current supply in the case of the displacer shown in FIG. 6.

Introduced into the wave troughs 29 in the embodiment shown in FIG. 6 are profile rails 66. The profile rails 66 reduce the free volume between solid electrolyte 3 and displacer 23, thereby further reducing the space that can be occupied by the liquid alkali metal.

FIGS. 7 and 8 show a displacer in a further embodiment. The displacer 23 comprises an outer shell 62, an inner shell 63, and a core 64. The outer shell 62 and the inner shell 63 are made from a stainless steel or graphite. A nonferrous metal is used as material for the core 64. To produce the displacer 23, the outer shell 62 is formed by fabricating a sheet steel cladding from a stainless steel sheet or stainless steel foil in such a way that it fits into the internal contour of the solid electrolyte 3 with under dimensioning. Into the interior space formed by the sheet steel cladding, an interior sheet steel body is introduced concentrically in order to form the inner shell 63. The interior sheet steel body here may be constructed in just the same way as the sheet steel cladding for the outer shell 62. Cast into the space between the sheet steel cladding and the interior sheet steel body, under pressure, is the nonferrous metal, preferably aluminum, zinc or an alloy comprising at least one of these metals, to form the core 64. Because of the pressure, the sheet steel cladding is pressed against the inner contour of the solid electrolyte 3 and so conforms to the shape of the solid electrolyte 3, thereby compensating manufacturing deviations.

When casting is complete, the nonferrous metal solidifies and cools down subsequently further. Owing to differences in shrinkage on cooling, a defined minimal shrinkage gap 67 is formed between the solid electrolyte 3 and the outer shell 62, leaving only little space for the alkali metal. In the case of this embodiment, in the same way as for the embodiment shown in FIG. 6, current supply is accomplished preferably by the core 64.

Alternatively to the casting of the intermediate space between the sheet steel cladding for the outer shell 62 and the interior sheet steel body for the inner shell 63, it is also possible first to insert the sheet steel cladding for the outer shell 62 into the solid electrolyte 3 and to insert a hollow body made, for example, from a heat-resistant aluminum alloy. The hollow body made from the heat-resistant aluminum alloy likewise corresponds to the internal geometry of the solid electrolyte, but has underdimensioning relative to the sheet steel cladding for the outer shell 62.

At a temperature below the melting temperature of the hollow body, but at which the material of the hollow body is plastically deformable, the hollow body is conformed by internal overpressure, and the plastic deformation that is initiated as a result, to the internal wall of the solid electrolyte. In this way, manufacturing inaccuracies from the ideal contour of the solid electrolyte 3 are compensated. The sheet steel cladding is pressed against the internal contour of the solid electrolyte 3, as a result of the press introduction of the hollow body, and is thereby conformed to said contour. On cooling, as a result of differences in thermal contraction, a defined minimal shrinkage gap 67 is formed between the internal contour of the solid electrolyte 3 and the sheet steel cladding that forms the outer shell 62. This keeps the space for the liquid alkali metal to a minimum. Current supply is effected preferably via the hollow body that forms the core 64.

A further possibility for the production of the displacer 23 is shown in FIGS. 9 and 10.

The construction of the completed displacer 23 corresponds essentially to that shown in FIGS. 7 and 8. However, rather than a closed sheet steel cladding, the outer shell is produced using a cylindrically bent metal sheet 61 made from stainless steel, as for example from a stainless steel foil. The cylindrically bent metal sheet 61 has an open longitudinal seam at which said metal sheet overlaps with its edges. This enables conformance to the internal contour of the solid electrolyte 3. The base cap with which the displacer 23 is sealed at the bottom may be part of the cylindrically bent metal sheet 61 or may be an independent component, as shown in FIG. 10. In that case the base 69 has an upward-pointing edge 68 which surrounds the cylindrically bent metal sheet 61. The dimensions of cylindrically bent metal sheet 61 and base 69 are similar to the internal contour of the solid electrolyte 3, but have overdimensioning relative to that contour. To produce the displacer, the cylindrically bent metal sheet 61 and optionally the separate base 69 are inserted into the solid electrolyte 3 in such a way that cylindrically bent metal sheet 61 and optionally the base 69 bear resiliently against the internal contour of the solid electrolyte 3. Thereafter a hollow body 60, preferably composed of a heat-resistant aluminum alloy, is inserted, with a geometry similar to that of the internal contour of the solid electrolyte 3, but with underdimensioning relative to that contour. At a temperature at which the material of the hollow body 60 is plastically deformable, but situated still below the melting temperature of the material of the hollow body 60, the hollow body 60 is conformed, by internal overpressure and by the plastic deformation initiated as a result, to the internal contour of the solid electrolyte. The cylindrically bent metal sheet 61 lying between the hollow body 60, and optionally the base 69, are in this case pressed against the internal contour of the solid electrolyte 3 and are therefore able to conform to it. Owing to differences in contraction, cooling is accompanied by the formation of a shrinkage gap, leaving only little space for the alkali metal. At the same time, as a result of the application of pressing, the gap in the cylindrically bent metal sheet 61 closes up, and so, in the case of the completed displacer 23, there is no contact between alkali metal and the material of the hollow body 60 that forms the core 64. Current supply preferably takes place, as in the case of the above-described embodiments, via the core 64 made from the nonferrous metal or from an alloy comprising the nonferrous metal.

LIST OF REFERENCE NUMERALS

1 Electrode unit
3 Solid electrolyte
5 Layer insulating in terms of electron conduction
7 Porous electrode
9 Segment wall
11 Cover
13 Flow channel
15 Inlet opening
17 Outlet opening
19 Flow barrier
21 Current terminal
23 Displacer
25 Gap
27 Channel
29 Trough
31 Peak
33 Extension
35 Projection
37 Recess
39 Current conductor
41 Tube
43 Core
45 Internal region of the displacer 23
47 Current conductor
49 Special steel tube
51 Core
60 Hollow body
61 Cylindrically bent metal sheet
62 Outer shell
63 Inner shell
64 Core
65 Interior
66 Profile rail
67 Shrinkage gap
68 Upwardly bent edge
69 Base

The invention claimed is:

1. An electrode unit for an electrochemical device comprising;
    a solid electrolyte dividing a compartment for a cathode material and a compartment for an anode material,
    a porous electrode being extensively connected to the solid electrolyte, and
    a displacer closed at the bottom, and accommodated in the anode material compartment, wherein the displacer comprises an outer shell of stainless steel or graphite, and a core of a nonferrous metal, the nonferrous metal being thermoplastically deformable at a temperature which is lower than the temperature at which the outer shell is thermoplastically deformable, and where for production the outer shell is pressed onto the solid electrolyte by heating of the nonferrous metal, and on cooling of the nonferrous metal a gap is formed between the solid electrolyte and the outer shell.

2. The electrode unit according to claim 1, wherein the displacer comprises an outer contour with projections and recesses.

3. The electrode unit according to claim 2, wherein the projections and recesses are realized by means of a waveform or zig zag form on the displacer.

4. The electrode unit according to claim 1, wherein the outer shell of stainless steel or graphite is a flexible sheet.

5. The electrode unit according to claim 1, wherein the outer shell comprises a cylindrically bent metal sheet whose edges overlap in axial direction.

6. The electrode unit according to claim 5, wherein the outer shell comprises a base which, with an upwardly bent edge, surrounds the cylindrically bent metal sheet or is surrounded by cylindrically bent metal sheet, so that the base is movable relative to the outer shell for the production of the displacer.

7. The electrode unit according to claim 1, wherein the displacer having the outer shell of stainless steel further comprises an inner shell of stainless steel and the core of the nonferrous metal is disposed between the inner and the outer shells.

8. The electrode unit according to claim 7, wherein the nonferrous metal is zinc, aluminum or an alloy comprising at least one of these metals.

9. The electrode unit according to claim 1, wherein the displacer comprises a conductor to conduct current.

10. The electrode unit according to claim 9, wherein the conductor comprises a special steel tube closed at both ends and with a core of an electrically highly conductive material and are arranged in recesses of the displacer, or wherein the conductor comprises a coating of an electrically highly conductive material on the inside of the displacer.

11. The electrode unit according to claim 9, wherein the conductor comprises a special steel tube closed at both ends and with a core of an electrically highly conductive material are clamped in the recesses.

12. The electrode unit according to claim 10, wherein the electrically highly conductive material is selected from the group consisting of copper, aluminum, silver, gold, sodium, and also mixtures and alloys comprising at least one of these metals.

13. The electrode unit according to claim 1, wherein the solid electrolyte is of cylindrical design and closed at one end, and the porous electrode surrounds the solid electrolyte, the compartment for the anode material being surrounded by the solid electrolyte.

14. The electrode unit according to claim 1, wherein the displacer allows an anode material to flow through the annular gap.

15. The electrode unit according to claim 1, wherein the solid electrolyte (3) is made from β"-alumina.

16. The electrode unit according to claim 1, wherein the anode material is an alkali metal.

17. The electrode unit according to claim 1, wherein the cathode material is sulfur or polysulfide.

18. An electrolysis cell comprising an electrode according to claim 1.

19. The electrolysis cell according to claim 18 further comprising a liquid alkali metal as anode material and sulfur or polysulfide as cathode material.

20. An electrode for an electrochemical cell, the electrode prepared by a process comprising:
providing a cylindrical foil with an inner and outer surface, and which is closed at one end, the foil being a stainless steel or graphite;
providing a solid electrolyte with an inner and outer surface of corresponding cylindrical shape, which is closed at one end;
inserting the foil into the solid electrolyte such that the outer surface of the foil contacts the inner surface of the solid electrolyte;
introducing a nonferrous metal into the cylindrical foil, the nonferrous metal in contact with the inner surface of the foil;
heating the nonferrous metal such that the expansion of the nonferrous metal upon heating presses against the foil into the solid electrolyte;
cooling the nonferrous metal such that the contraction of the nonferrous metal upon cooling forms a gap between the outer surface of the foil and the solid electrolyte;
positioning an alkali metal in molten form within the gap to provide an anode material; and
positioning a cathode material on the outer surface of the solid electrolyte.

21. The electrode according to claim 20, wherein the cathode material is sulfur or a polysulfide, the solid electrolyte is β-alumina or β"-alumina, and the nonferrous metal is selected from zinc, aluminum, copper, or an alloy comprising zinc or aluminum.

* * * * *